Patented Jan. 27, 1942

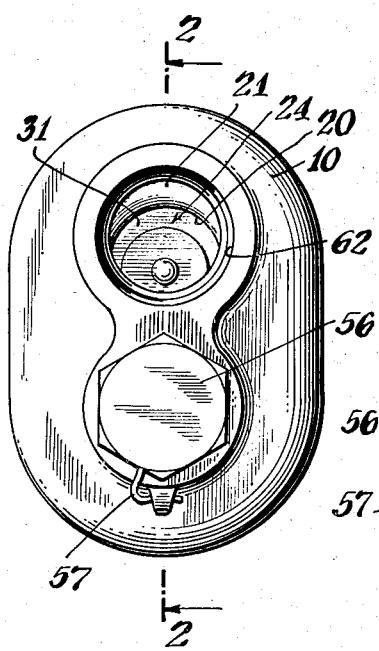
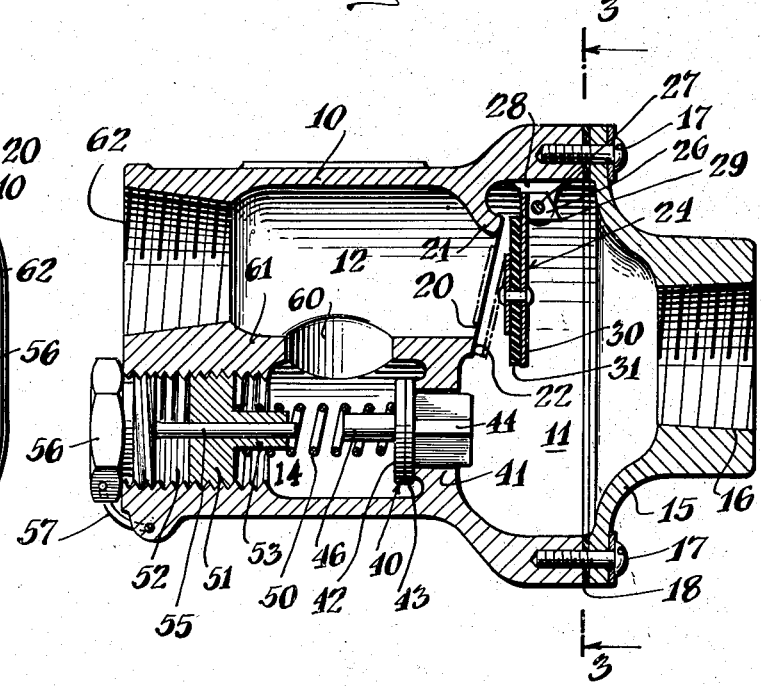
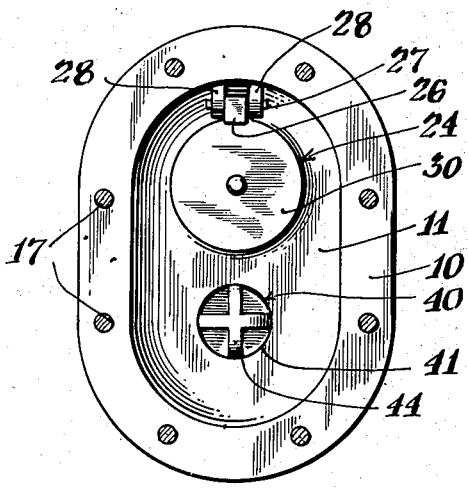

2,271,497

UNITED STATES PATENT OFFICE 2,271,497

PRESSURE RELIEF CHECK VALVE

Arthur T. Newell, Huntington, N. Y., assignor to Kenyon Instrument Co., Inc., Huntington Station, N. Y., a corporation of New York Application February 4, 1941, Serial No. 377,315

2 Claims. (Cl. 277—61)

This invention relates to check-valves and more particularly to check-valves having pressure-relief characteristics.

The invention is applicable to fuel tank vent systems for military and naval aircraft and particularly for aircraft which are subjected to catapulting where the fuel surge resulting from the catapulting tends to cause a loss of fuel through the vent system. Also, aircraft may fly, or may even be parked on the ground, in such position as to cause fuel to tend to flow out of the fuel tank vent lines.

In the above instances the check-valve in the fuel tank vent line automatically closes, thereby sealing the tank vent. Any subsequent expansion of the fuel or vaporization thereof while the check valve is closed tends to cause excessive strains in the gasoline tank and piping system.

The invention is also applicable to the fuel vent systems of aircraft tanks which are subject to carbon dioxide purging. During this operation the check-valve may close due to the initial surge of the carbon dioxide into the gasoline tank, thereby preventing the proper purging operation from taking place.

It is an object of the present invention to provide a novel and improved check valve having pressure relief characteristics such that excessive pressures are prevented from building up even when the check valve is closed.

Another object is to provide a novel and improved check valve which automatically closes in response to a reverse surge of fluid and which reopens when a predetermined pressure has been built up.

Another object is to provide a valve of the above type having novel and improved details of construction and features of operation.

Various other objects and advantages will be apparent as the nature of the invention is more fully disclosed.

Although the novel features which are believed to be characteristic of this invention are pointed out more particularly in the claims appended hereto, the invention itself may be better understood by referring to the following description, taken in connection with the accompanying drawing, in which a specific embodiment thereof has been set forth for purposes of illustration.

In the drawing,

Fig. 1 is a front elevation of a valve embodying the present invention;

Fig. 2 is a longitudinal section taken on the line 2—2 of Fig. 1; and

Fig. 3 is a transverse section taken on the line 3—3 of Fig. 2.

In the following description and in the claims certain specific terms are used for convenience in referring to various details of the invention. These terms, however, are to be given as broad an interpretation as the state of the art will permit.

Referring to the drawing more in detail, the invention is shown as applied to a valve comprising a housing 10, having formed therein a pressure chamber 11, a vent chamber 12 and a pressure relief chamber 14. The pressure chamber 11 may be closed by a head 15 having a bore 16 threaded for attachment to the vent pipe of a fuel tank or the like. The head 15 may be secured to the housing 10 by suitable means, such as screws 17 and may be sealed by a gasket 18.

The vent chamber 12 comprises a bore communicating with the pressure chamber 11 through a port 20 formed by a circular flange 21. The flange 21 is milled to provide a valve seat 22, which is inclined to the vertical by a small angle, such as, for example, 15°, so that the valve is normally held in open position by gravity as indicated.

A valve flapper 24 is adapted to seat on the valve seat 22. The flapper is shown as attached to a lug 26, which is pivoted by a pin 27 to an ear 28 formed on the housing 10 and is arranged so that the valve is free to swing from open to closed position. The lug 26 is provided with an ear 29 which is adapted to engage the housing 10 to limit the movement of the valve flapper. The valve flapper 24 is shown as comprising a metal disc 30 faced by a suitable valve material 31, such, for example, as a synthetic rubber composition.

The arrangement is such that the valve flapper 24 normally hangs vertically, thereby leaving the port 20 open to constitute, for example, a fuel tank vent. However, a surge of fluid from right to left causes the valve flapper 24 to seat against the valve seat 22, thereby closing the vent and preventing the escape of fluid.

For pressure relief purposes, when the check valve is closed in the manner above mentioned, a spring-loaded relief valve 40 is provided in the pressure relief chamber 14. The pressure relief chamber 14 constitutes a bore which is parallel to the bore forming the vent chamber 12 and communicates with the pressure chamber 11 through a port 41. The pressure relief valve 40 comprises a valve member formed by a disc 42 of metal having a facing 43 similar to the facing 31 of the valve flapper 24. A guide member 44 is secured to the disc 42 and extends through the port 41. The valve 40 is also provided with a pin 46 which constitutes a stop to limit the opening movement of the valve.

The valve 40 is normally held closed by means of a spring 50, which is seated against the valve disc 42 over the pin 46 and bears against a follower 51 which is threaded in a threaded portion 52 of the bore constituting the pressure relief chamber 14. The follower 51 is provided with a pin 53 which secures the spring 50 in position. The relief pressure may be adjusted by suitable adjustment of the follower 51 in the threaded portion 52 of the pressure relief chamber.

In order to limit the opening movement of the valve 40, a stop member is provided comprising a pin 55 which extends through a bore in the follower 51 and is adapted to engage the end of the pin 46 for the above purpose. The pin 55 may be longitudinally adjusted by suitable means and in the embodiment shown is carried by a threaded cap 56 which closes the chamber 14 and may be locked in adjusted position by a lock wire 57.

A port 60 is provided in the wall 61 separating the vent chamber 12 from the pressure relief chamber 14. This port 60 remains open to provide a permanent vent path through the port 41, the chamber 14, the port 60 and the chamber 12 when the valve 40 is open. The chamber 12 is permanently open to the atmosphere as at 62 and may be connected to a vent pipe or the like, as desired.

In the operation of this valve the valve flapper 24 is normally open and the valve 40 is normally closed, thereby providing a vent from the pressure chamber 11 through the vent chamber 12 to the atmosphere. In response to a surge of fluid from right to left caused by catapulting or by tilting of aircraft in which it is installed or from any other cause, the valve flapper 24 is caused to seat, as indicated, thereby preventing the escape of fluid. However, when the valve flapper 24 is closed, any excess pressure which may be built up in the chamber 11 beyond the pressure at which the pressure relief valve 40 is set to open, causes said valve to open against the force of the spring 50, thereby establishing direct communication through the pressure relief chamber 14 and the port 60 to the vent chamber 12 and thence to the atmosphere. The pressure relief valve accordingly operates as a by-pass for the check valve and prevents any excess pressure from being built up when the check valve itself is closed.

While the above described assembly is particularly adapted for use in the vent lines of aircraft fuel tanks, it is to be understood that the invention is capable of various uses and is not to be restricted thereto. Various changes and modifications will be apparent to a person skilled in the art. The invention is only to be limited in accordance with the scope of the following claims.

What is claimed is:

1. A valve for the vent pipe of a mobile object comprising a housing having a pressure chamber adapted to be connected to said vent pipe and a pair of adjacent horizontal passages extending from said pressure chamber, one of said passages being open to the atmosphere to form a vent, a port connecting the end of said last passage to said pressure chamber, an inclined valve seat on said port, a gravity biased flapper valve pivoted in said pressure chamber and normally hanging vertically downwardly therein to maintain a continuous vent passage and being adapted to swing against said valve seat for closing said vent passage in response to reverse flow of fluid or when said housing is in an inclined position, a permanently open port between said horizontal passages, a port connecting the end of the other of said passages to said pressure chamber, a spring loaded pressure relief valve in said last port, said relief valve being normally closed and being adapted to open in response to a high pressure in said pressure chamber to establish connection through said permanently open port to said vent passage, and valve adjusting means threaded into the other end of said other passage and closing the same.

2. A valve for the vent pipe of a mobile object comprising a housing having a pressure chamber adapted to be connected to said vent pipe and a pair of adjacent horizontal passages extending from said pressure chamber, one of said passages being open to the atmosphere to form a vent, a port connecting the end of said last passage to said pressure chamber, a valve seat on said port, a pivoted flapper valve so arranged as to be normally held in open position by gravity and adapted to swing against said valve seat for closing said vent passage, a permanently open port between said horizontal passages, a port connecting the end of the second passage to said pressure chamber, a spring loaded pressure relief valve in said last port, said relief valve being normally closed and being adapted to open in response to a high pressure in said pressure chamber to establish connection through said permanently open port to said vent passage, and valve adjusting means threaded into the other end of said second passage and closing the same.

ARTHUR T. NEWELL.